US008938635B2

(12) United States Patent
Chueh et al.

(10) Patent No.: US 8,938,635 B2
(45) Date of Patent: *Jan. 20, 2015

(54) HOST DETECTION CIRCUIT POWERED FROM PRIMARY SIDE OF THE ALTERNATING CURRENT ADAPTOR FOR DETECTING CHANGES TO A POWER LEVEL PULSE OF AN INFORMATION HANDLING SYSTEM

(71) Applicant: Dell Products, LP, Round Rock, TX (US)

(72) Inventors: Yung Fa Chueh, Taipei (TW); Chih-Chieh Yin, Keelung (TW); Chin-Jui Liu, Xizhi (TW); Hsien Tsung Lin, Shin-Chuang (TW)

(73) Assignee: Dell Products, LP, Round Rock, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/975,939

(22) Filed: Aug. 26, 2013

(65) Prior Publication Data

US 2013/0346784 A1 Dec. 26, 2013

Related U.S. Application Data

(63) Continuation of application No. 12/722,757, filed on Mar. 12, 2010, now Pat. No. 8,543,859.

(51) Int. Cl.
*H02J 7/16* (2006.01)
*G06F 1/26* (2006.01)
*G06F 1/28* (2006.01)
*G06F 1/32* (2006.01)

(52) U.S. Cl.
CPC .. *G06F 1/26* (2013.01); *G06F 1/28* (2013.01); *G06F 1/32* (2013.01)
USPC ......... 713/340; 323/282; 320/145; 363/21.06

(58) Field of Classification Search
CPC ............... G06F 1/26; G06F 1/28; G06F 1/30; G06F 1/32
USPC .......................................... 320/145; 323/282
See application file for complete search history.

(56) References Cited

U.S. PATENT DOCUMENTS

| 6,911,845 | B2 | 6/2005 | Hossain et al. |
| 6,986,067 | B2 | 1/2006 | Odaohhara et al. |
| 8,427,113 | B2* | 4/2013 | Xing et al. .................... 320/145 |
| 2003/0185022 | A1* | 10/2003 | Ohishi ....................... 363/21.06 |

(Continued)

FOREIGN PATENT DOCUMENTS

EP   1 484 664 A2   8/2004

*Primary Examiner* — Thomas Lee
*Assistant Examiner* — Aurel Prifti
(74) *Attorney, Agent, or Firm* — Larson Newman, LLP

(57) ABSTRACT

A method for managing an alternating current adaptor system is disclosed. A direct current voltage is received at a high impedance power delivery network from a primary side of an alternating current adaptor system. An isolated voltage is output from the high impedance power delivery network to components of a secondary side of the alternating current adaptor system. A transition in a power state identification of an information handling system associated with the alternating current adaptor system is detected. An output voltage level of the alternating current adaptor system is alternated in response to the transition in the power state identification of the information handling system.

20 Claims, 5 Drawing Sheets

(56) References Cited

U.S. PATENT DOCUMENTS

| | | |
|---|---|---|
| 2004/0196669 A1 | 10/2004 | Thrap |
| 2004/0257055 A1 | 12/2004 | Aioanei |
| 2005/0206327 A1* | 9/2005 | Hsu et al. ................ 315/276 |
| 2005/0258800 A1 | 11/2005 | Aradachi et al. |
| 2006/0098935 A1* | 5/2006 | Yu et al. ................... 386/1 |
| 2006/0181232 A1* | 8/2006 | Oljaca et al. ............. 318/268 |
| 2008/0031021 A1 | 2/2008 | Ros et al. |
| 2008/0301476 A1* | 12/2008 | Itakura ...................... 713/300 |
| 2010/0067268 A1 | 3/2010 | Kasprzak et al. |
| 2010/0231185 A1* | 9/2010 | Yu et al. .................. 323/282 |
| 2011/0127978 A1* | 6/2011 | Lee et al. ................. 323/282 |
| 2011/0225441 A1 | 9/2011 | Chueh et al. |

* cited by examiner

HOST DETECTION CIRCUIT POWERED FROM PRIMARY SIDE OF THE ALTERNATING CURRENT ADAPTOR FOR DETECTING CHANGES TO A POWER LEVEL PULSE OF AN INFORMATION HANDLING SYSTEM

CROSS REFERENCE TO RELATED APPLICATIONS

This application is a continuation of U.S. patent application Ser. No. 12/722,757, entitled "Host Detection Circuit Powered from Primary Side of the Alternating Current Adaptor for Detecting Changes to a Power Level Pulse of an Information Handling System," filed on Mar. 12, 2010, the disclosure of which is hereby expressly incorporated by reference in its entirety.

FIELD OF THE DISCLOSURE

This disclosure relates generally to information handling systems, and more particularly relates to a method for managing an alternating current adaptor system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A portable information handling system, such as a laptop computer, can operate using power from a battery and/or using power from a cord. The power cord generally has an alternating current to direct current (AC to DC) converter that converts AC power from a wall outlet into DC power similar to the power provided by the battery of the portable information handling system. Additionally, the power cord can charge the battery so that the portable information handling system can utilize the battery when the power cord is unplugged. The power cord may continue to convert the AC power to DC power even when the power cable is not plugged into the portable computer.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
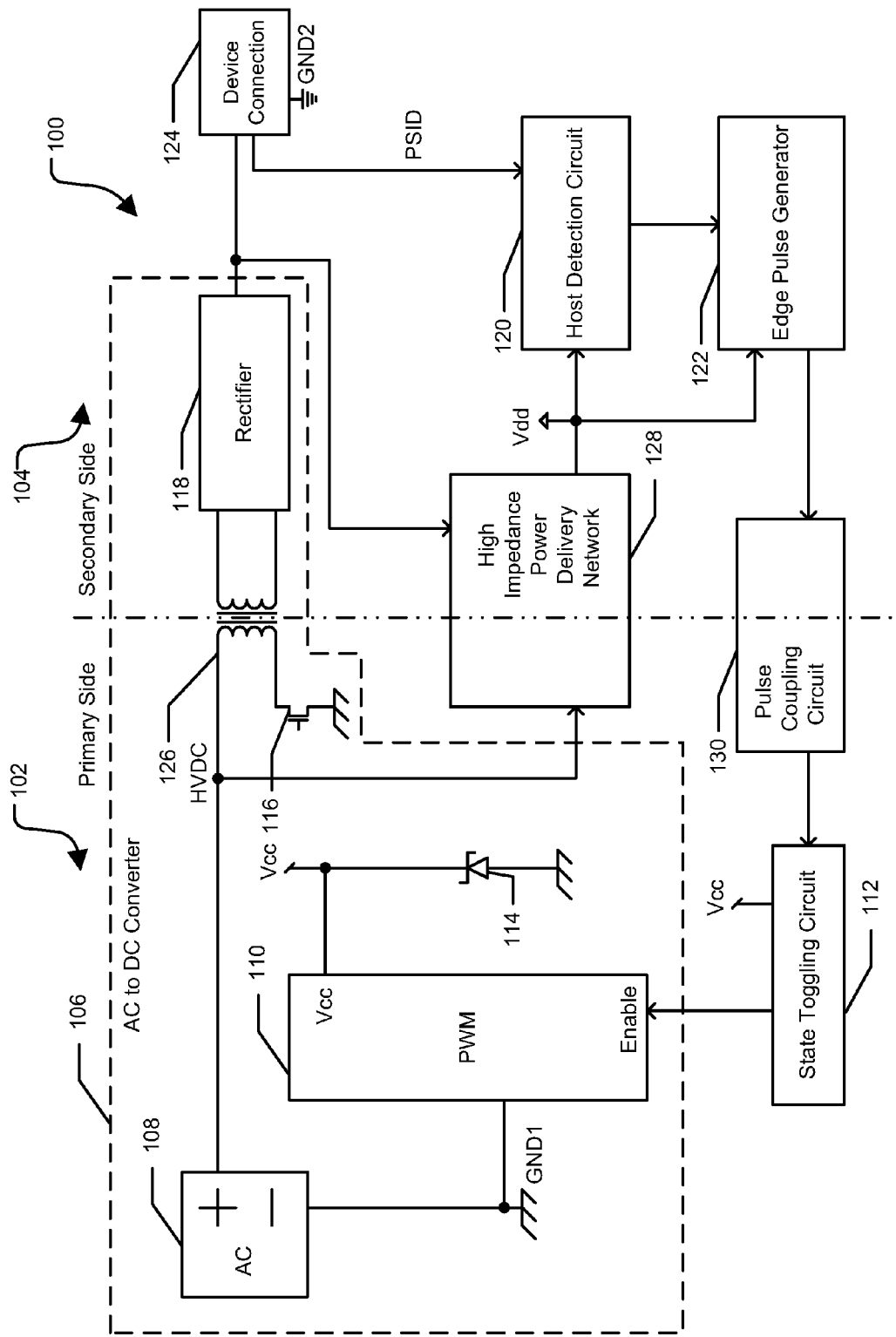
FIG. 1 is a block diagram of an alternating current adaptor for a portable information handling system.

FIG. 1 shows an alternating current (AC) adaptor system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The AC adaptor system 100 includes a primary side 102 and a secondary side 104 that are preferably isolated from each other. The AC adaptor system 100 also includes an AC to direct current (DC) converter 106 that includes portions of the primary side 102 and the secondary side 104. The primary side 102 of the AC to DC converter includes an AC input 108, a pulse width modulation (PWM) circuit 110, a diode 114, and a transistor 116. The remaindering of the primary side 102 of the AC adaptor system 100 includes a state toggling circuit 112. The secondary side 104 of the AC to DC converter 106 includes a rectifier 118. The remainder of the secondary side 104 of the AC adaptor system 100 includes a host detection circuit 120, an edge pulse generator 122, and a device connection 124. The primary side 102 and the secondary side 104 are preferably coupled together via a transformer 126, a high impedance power delivery network 128, and a pulse coupling circuit 130.

The AC input 108 includes a first terminal, and a second terminal connected to a first voltage reference, labeled GND1. The PWM circuit 110 includes a first terminal connected to the second terminal of the AC input 108, a second terminal connected to a second voltage reference, labeled Vcc, and a third terminal. The state toggling circuit 112 includes a first terminal connected to the third terminal of the PWM circuit 110, a second terminal connected to the second voltage reference, and a third terminal. The diode 114 includes a first terminal connected to the second terminal of the PWM circuit 110, and a second terminal connected to the first voltage reference. The transistor 116 includes a first current electrode, a second current electrode connect to the first voltage reference, and a control electrode.

The rectifier 118 includes first and second terminals, and a third terminal configured to provide a regulated direct current (DC) voltage to a device that is external to the AC adaptor system 100. The host detection circuit 120 includes first terminal connected to a third voltage reference, labeled Vdd, and second and third terminals. The edge pulse generator 122 includes a first terminal connected to the third terminal of the host detection circuit 120, a second terminal, and a third terminal connected to the first terminal of the host detection circuit. The device connection 124 includes a first terminal connected to the third terminal of the rectifier 118, a second terminal connected to the second terminal of the host detection circuit 120, and a third terminal connected to a fourth voltage reference, labeled GND2.

The transformer 126 includes a primary winding and a secondary winding. The primary winding of the transformer 126 includes a first terminal connected to the first terminal of the AC input 108, and a second terminal connected to the first current electrode of the transistor 116. The secondary winding of the transformer 126 includes a first terminal connected to the first terminal of the rectifier 118, and a second terminal connected to the second terminal of the rectifier. The high impedance power delivery network 128 includes a first terminal connected to the first terminal of the AC input 108, a second terminal connected to the first terminal of the device connection 124, and a third terminal connected to the first terminal of the host detection circuit 120. The pulse coupling circuit 130 includes a first terminal connected to the third terminal of the state toggling circuit 112, and a second terminal connected to the second terminal of the edge pulse generator 122.

During operation, the AC input 108 provides voltage to the first terminal of the primary winding of the transformer 126 via the activating and deactivating of the transistor 116. The voltage on the primary winding induces a voltage on the secondary winding that is then provided to the rectifier 118, which in turn rectifies the voltage into a DC voltage for use by the device. The PWM circuit 110 generates a PWM signal in response to an enable signal. The PWM signal is utilized by the primary side 102 of the AC to DC converter 106 to regulate the AC input voltage. The high impedance power delivery network 128 receives a voltage from the primary side 102, isolates and steps down the voltage to provide the secondary side 104 with an isolated low level DC voltage. The high impedance power delivery network 128 preferably provides the isolated low level DC voltage to the host detection circuit 120, to the edge pulse generator 122, and to the device connection 124.

The host detection circuit 120 preferably monitors the device connection 124 for changes in a power state identification (PSID) signal associated with the device. The PSID signal can change when the AC adaptor system 100 is connected to the device, when the AC adaptor system is removed from the device, when the AC adaptor system is isolated from the device, or the like. The AC adaptor system 100 can be isolated from the device when a battery (not shown) of the device is fully charged and/or the device no longer requires power from the AC adaptor system. When the PSID state changes, the host detection circuit 120 preferably changes the voltage state of the output of the host detection circuit. For example, if the host detection circuit 120 detects a PSID state change while outputting a high voltage level signal, the host detection circuit can transition the output voltage signal from the high voltage level to a low voltage level. Alternatively, if the host detection circuit 120 detects a PSID state change while outputting a low voltage level signal, the host detection circuit can transition the output voltage signal from the low voltage level to a high voltage level.

The edge pulse generator 122 is configured to receive the output voltage signal from host detection circuit 120, and is further configured to output a low voltage level pulse when a transition in the output voltage signal of the host detection circuit is detected. For example, the edge pulse generator 122 can initially output a high voltage level signal, and then detect a transition in the output voltage signal from the host detection circuit 120. The edge pulse generator 122 can then produce a low voltage level pulse in response to detecting the voltage level transition. The output signal of the edge pulse generator 122 is preferably received by the pulse coupling circuit 130, which in turn isolates the output signal from the edge pulse generator from a substantially identical pulse on the output of the pulse coupling circuit. Thus, the pulse coupling circuit 130 preferably isolates and then retransmits the output pulse of the edge pulse generator 122.

The output from the pulse coupling circuit 130 is preferably received at the state toggling circuit 112. The state toggling circuit 112 utilizes the output from the pulse coupling circuit 130 to enable or disable the PWM circuit 110. In an embodiment, a high voltage signal can enable the PWM circuit 110, and a low voltage signal can disable the PWM circuit. In an alternative embodiment, a low voltage signal can enable the PWM circuit 110, and a high voltage signal can disable the PWM circuit. When the PWM circuit 110 is disabled, no voltage is provided to the rectifier 118, such that the device is not provided with power from the AC adaptor system 100. Thus, a PSID state change alternates the PWM signal from enabled to disabled, and from disabled to enabled. The AC adaptor system 100 preferably saves energy when the secondary side 104 does not provide unnecessary power to the device.

Figure 2:
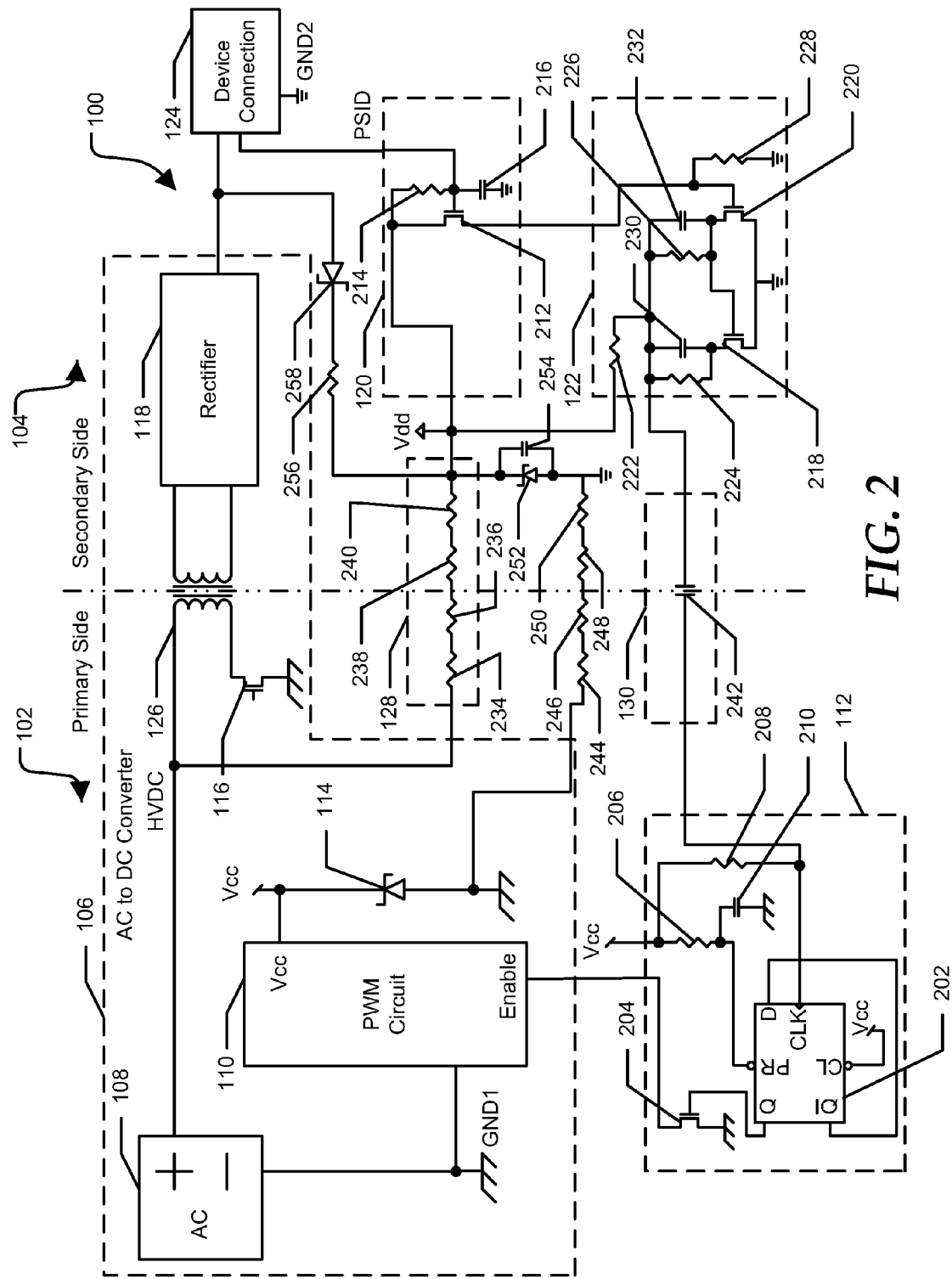
FIG. 2 is a schematic diagram of the alternating current adaptor.

FIG. 2 shows a schematic diagram of the AC adaptor system 100 including the AC to DC converter 106, the AC input 108, the PWM circuit 110, the state toggling circuit 112, the diode 114, the transistor 116, the rectifier 118, the host detection circuit 120, the edge pulse generator 122, the device connection 124, the transformer 126, the high impedance power delivery network 128, and the pulse coupling circuit 130. The AC input 108, the PWM circuit 110, the diode 114, the transistor 116, the rectifier 118, and the transformer 126 of the AC to DC converter 106 are connected together substantially the same as described above with respect to FIG. 1.

The state toggling circuit 112 includes a flip-flop circuit 202, a transistor 204, resistors 206 and 208, and a capacitor 210. The flip-flop circuit 202 includes a Q terminal, Q not terminal, D terminal connected to the Q not terminal, clear (CL) terminal connected to the first voltage reference, preset (PR) terminal, and a clock (CLK) terminal connected to the second terminal of the pulse coupling circuit 130. The transistor 204 includes a first current electrode connected to the third terminal of the PWM circuit 110, a second current electrode connected to the first voltage reference, and a control electrode connected to the Q terminal of the flip-flop circuit 202. The resistor 206 includes a first terminal connected to the second voltage reference, and a second terminal connected to the PR terminal of the flip-flop circuit 202. The resistor 208 includes a first terminal connected to the first terminal of the resistor 206, and a second terminal connected to the clock terminal of the flip-flop circuit 202. The capacitor 210 includes a first terminal connected to the second terminal of the resistor 206, and a second terminal connected to the first voltage reference. During operation, the flip-flop circuit 202, the transistor 204, the resistors 206 and 208, and the capacitor 210 perform substantially the same functions as described above with respect to the state toggling circuit 112 of FIG. 1.

The host detection circuit 120 includes a transistor 212, a resistor 214, and a capacitor 216. The transistor 212 includes a first current electrode connected to the second terminal of the high impedance power delivery network 128, a second current electrode, and a control electrode connected to the second terminal of the device connection 124. The resistor 214 includes a first terminal connected to the first current electrode of the transistor 212, and a second terminal connected to the control electrode of the transistor. The capacitor 216 includes a first terminal connected to the control electrode of the transistor 212, and a second terminal connected to the third voltage reference. During operation, the transistor 212, the resistor 214, and the capacitor 216 perform substantially the same functions as described above with respect to the host detection circuit 120 of FIG. 1.

The edge pulse generator 122 includes transistors 218 and 220, resistors 222, 224, 226, and 228, and capacitors 230 and 232. The transistor 218 includes a first current electrode, a second current electrode connected to the fourth voltage reference, and a control electrode. The transistor 220 includes a first current electrode connected to the control electrode of the transistor 218, a second current electrode connected to the fourth voltage reference, and a control electrode connected to the second current electrode of the transistor 212 of the host detection circuit 120. The resistor 222 includes a first terminal connected to the third voltage reference, and a second terminal. The resistor 224 includes a first terminal connected to the second terminal of the resistor 222, and a second terminal connected to the first current electrode of the transistor 218.

The resistor 226 includes a first terminal connected to the second terminal of the resistor 222, and a second terminal connected to the first current electrode of the transistor 220. The resistor 228 includes a first terminal connected to the control electrode of the transistor 220, and a second terminal connected to the fourth voltage reference. The capacitor 230 includes a first terminal connected to the second terminal of the resistor 222, and a second terminal connected to the first current electrode of the transistor 218. The capacitor 232 includes a first terminal connected to the second terminal of the resistor 222, and a second terminal connected to the first current electrode of the transistor 220. During operation, the transistors 218 and 220, the resistors 222, 224, 226, and 228, and the capacitors 230 and 232 perform substantially the same functions as described above with respect to the edge pulse generator 122 of FIG. 1.

The high impedance power delivery network includes resistors 234, 236, 238, and 240. The resistor 234 has a first terminal connection to the first terminal of the primary winding of the transformer 126, and a second terminal. The resistor 236 has a first terminal connection to the second terminal of the resistor 234, and a second terminal. The resistor 238 has a first terminal connection to the second terminal of the resistor 236, and a second terminal. The resistor 240 has a first terminal connection to the second terminal of the resistor 238, and a second terminal connected to the first current electrode of the transistor 212. During operation, the resistors 234, 236, 238, and 240 perform substantially the same functions as described above with respect to the high impedance delivery network 128 of FIG. 1.

The pulse coupling circuit 130 includes a capacitor 242. The capacitor has a first terminal connected to the first terminal of the resistor 224, and a second terminal connected to the clock terminal of the flip-flop circuit 202. During operation, the capacitor 242 performs substantially the same function as described above with respect to the pulse coupling circuit 130 of FIG. 1.

The voltage regulator 100 also includes resistors 244, 246, 248, and 250, a diode 252, and a capacitor 254. The resistor 244 includes a first terminal connected to the second terminal of the diode 116, and a second terminal. The resistor 246 includes a first terminal connected to the second terminal of the resistor 244, and a second terminal. The resistor 248 includes a first terminal connected to the second terminal of the resistor 246, and a second terminal. The resistor 250 includes a first terminal connected to the second terminal of the resistor 248, and a second terminal. The diode 252 includes a first terminal connected to the second terminal of the resistor 240 of the high impedance power delivery network 128, and a second terminal connected to the second terminal of the resistor 250. The capacitor 254 includes a first terminal connected to the first terminal of the diode 252, and a second terminal connected to the second terminal of the diode. The resistors 244, 246, 248, and 250, a diode 252, and a capacitor 254 preferably provide additional coupling between the primary side 102 and the secondary side 104.

The voltage regulator 100 additionally includes resistor 256 and a diode 258. The resistor 256 includes a first terminal connected to the second terminal of the resistor 240 of the high impedance power delivery network 128, and a second terminal. The diode 258 includes a first terminal connected to the second terminal of the resistor 256, and a second terminal connected to the first terminal of the device connection 124. The resistor 256 and the diode 258 preferably provide coupling between the device connection 124 and the high impedance power delivery network 128. The diode 258 also preferably prevents current from flowing from the high impedance power delivery network 128 to the device connection 124.

Figure 3:
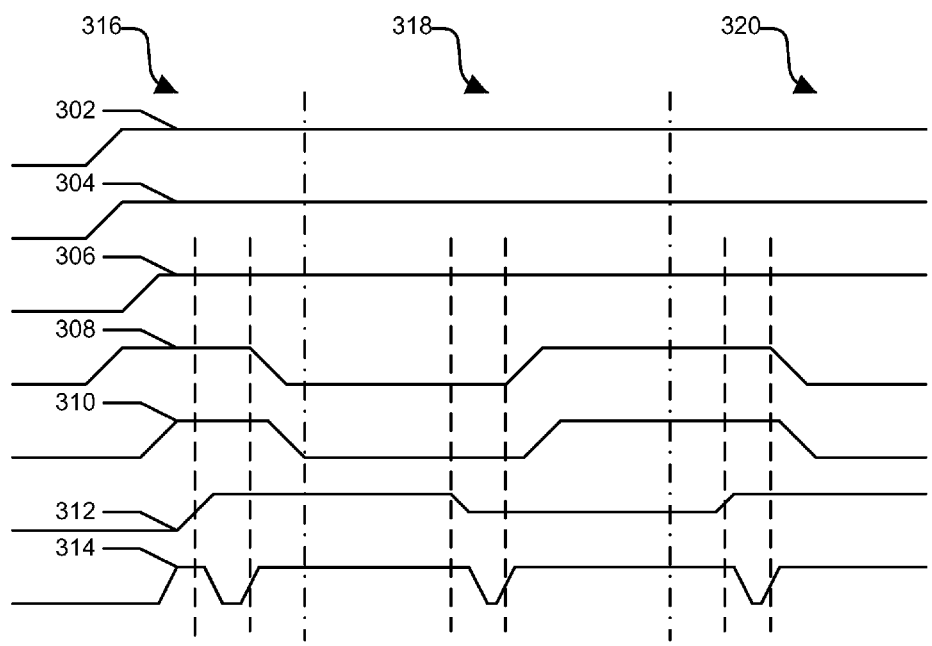
FIG. 3 is a timing diagram of various waveforms associated with the alternating current adaptor.

FIG. 3 shows a Vcc waveform 302, a Vdd waveform 304, a preset waveform 306, a flip-flop output waveform 308, an AC adaptor system output waveform 310, a PSID state waveform 312, and a pulse waveform 314. The waveforms can vary during a first event 316, a second event 318, and a third event 320. For example, the first event 316 can be when the AC adaptor system 100 is plugged into a wall outlet but the AC adaptor system is not connected to a device, such as a portable information handling system. The second event 318 can be when the AC adaptor system 100 is plugged into the wall outlet and also connected to the device. The third event 320 can be when the AC adaptor system 100 is plugged into the wall outlet, connected to the device, but isolated from the device or the AC adaptor system is unplugged from the device. The AC adaptor system 100 can be isolated from the device when a battery of the device is fully charged and the device is not requiring power from the AC adaptor. For example, the AC adaptor system 100 can be isolated from the device when the battery is fully charged, the device is turned off, but the AC adaptor is still plugged into the device.

During the first event 316, the Vcc waveform 302 and the Vdd waveform 304 can transition from a low voltage level to a high voltage level, such that the Vcc waveform can provide power to the primary side 102 of the AC adaptor system 100 and the Vdd waveform can provide power to the second side 104. The Vcc waveform 302 and the Vdd waveform 304 provide power to different sides of the AC adaptor system 100 to preferably isolate the primary side 102 from the secondary side 104. The Vdd waveform 304 is preferably lower in magnitude that the Vcc waveform 302, so that the AC adaptor system 100 can reduce energy losses when the AC adaptor system is not plugged into the device or is isolated from the device.

When the Vcc waveform 302 and the Vdd waveform 304 transition to the high voltage level, the preset waveform 306 preferably also transitions to a high voltage level. Additionally, as the AC adaptor system 100 is powered on the flip-flop output waveform 308 transitions to a high voltage level, such that the PWM circuit 110 is enabled and the AC adaptor system output waveform 310 transitions to a high voltage level to provide power to the device from the rectifier 118 of the AC to DC converter 106. However, the PSID state waveform 312 from the host detection circuit 120 preferably transitions to a high voltage level in response to the device not being connected to the AC adaptor system 100.

The edge pulse generator 122 can detect the transition of the PSID state waveform 312, and generate a low voltage level pulse in the pulse waveform 314 that is preferably transmitted to the state toggling circuit 112. When the flip-flop circuit 202 of the state toggling circuit 112 detects the rising edge of the low voltage level pulse in the pulse waveform 314, the flip-flop output waveform 308 changes states and transitions to a low voltage level. The low voltage level of the flip-flop output waveform 308 preferably disables the PWM circuit 110, and the AC adaptor system output waveform 310 transitions to a low voltage level. When the AC adaptor system output waveform 310 is at the low voltage level, the rectifier 118 preferably does not operate so that no power is provided to the device connection 124 and the energy loss in the AC adaptor system 100 is reduced.

During the second event 318, the AC adaptor system 100 is plugged into the device, and the PSID state waveform 312 from the host detection circuit 120 transitions from the low voltage level to the high voltage level. The edge pulse generator 122 can detect the transition of the PSID state waveform 312, and generate the low voltage level pulse in the pulse waveform 314 that is preferably transmitted to the state toggling circuit 112. When the flip-flop circuit 202 of the state toggling circuit 112 detects the rising edge of the low voltage level pulse in the pulse waveform 314, the flip-flop output waveform 308 changes state and transitions to the high voltage level. The high voltage level of the flip-flop output waveform 308 preferably enables the PWM circuit 110, and the AC adaptor system output waveform 310 transitions to the high voltage level. When the AC adaptor system output waveform 310 is at the high voltage level, the rectifier 118 preferably operates so that power is provided to the device connection 124.

During the third event 320, the AC adaptor system 100 is either unplugged from the device or isolated from the device, such that the PSID state waveform 312 from the host detection circuit 120 transitions from the high voltage level to the low voltage level. The edge pulse generator 122 can detect the transition of the PSID state waveform 312, and generate a low voltage level pulse in the pulse waveform 314 that is preferably transmitted to the state toggling circuit 112. When the flip-flop circuit 202 of the state toggling circuit 112 detects the rising edge of the low voltage level pulse in the pulse waveform 314, the flip-flop output waveform 308 changes states and transitions to a low voltage level. The low voltage level of the flip-flop output waveform 308 preferably disables the PWM circuit 110, and the AC adaptor system output waveform 310 transitions to a low voltage level. When the AC adaptor system output waveform 310 is at the low voltage level, the rectifier 118 preferably does not operate so that no power is provided to the device connection 124 and the energy loss in the AC adaptor system 100 is reduced.

Figure 4:
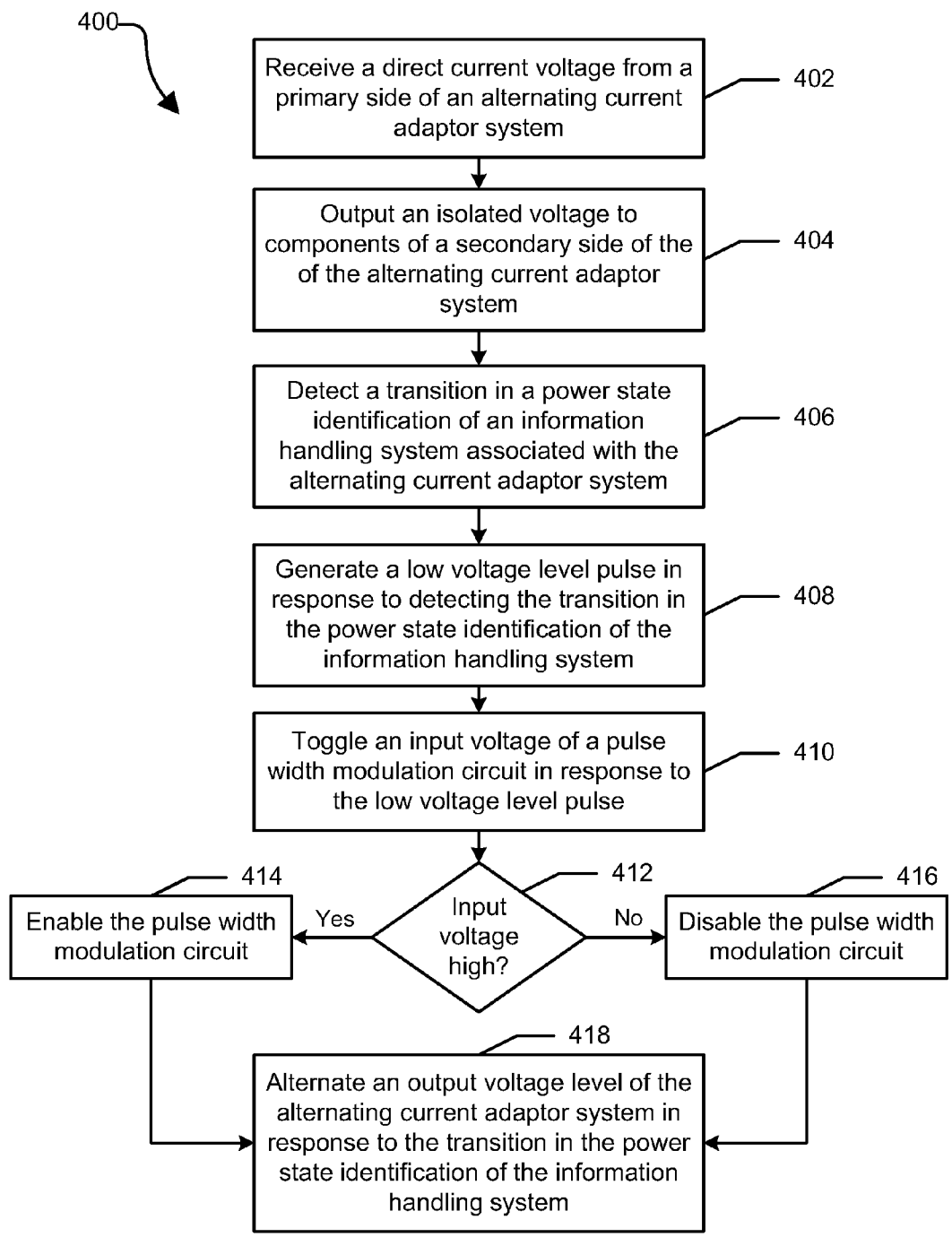
FIG. 4 is a flow diagram of a method for managing the alternating current adaptor.

FIG. 4 shows a flow diagram of a method 400 for managing the AC adaptor system 100. At block 402, a direct current voltage is received from a primary side of an alternating current adaptor system. The direct current voltage can be received at a high impedance power delivery network. An isolated voltage is output from the high impedance power delivery network to components of a secondary side of the alternating current adaptor system at block 404. The components of the secondary side can include a host detection circuit, an edge pulse generator, a device connection, or the like.

At block 406, a transition in a power state identification of an information handling system associated with the alternating current adaptor system is detected. The power state identification can indicate that the alternating current adaptor system is plugged into the information handling system, that the alternating current adaptor system is unplugged from the information handling system, or that the alternating current adaptor system is plugged into the information handling system and that the alternating current adaptor system is isolated from the information handling system. At block 408, a low voltage level pulse is generated in response to detecting the transition in the power state identification of the information handling system. An input voltage of a pulse width modulation circuit is toggled in response to the low voltage level pulse at block 410.

At block 412, a determination is made whether the input voltage of the pulse width modulation circuit is at a high voltage level or a low voltage level. If the input voltage of the pulse width modulation circuit is toggled to the high voltage level, the pulse width modulation circuit is enabled at block 414. If the input voltage of the pulse width modulation circuit is toggled to the low voltage level, the pulse width modulation circuit is disabled at block 416. At block 418, a voltage level of the alternating current adaptor system is alternated in response to the transition in the power state identification of the information handling system. The output voltage level of the alternating current adaptor system can transition from a high voltage level to a low voltage when the power state identification indicates that the alternating current adaptor is not connected to the information handling system or that the alternating current adaptor is isolated from the information handling system. Alternatively, the voltage level of the alternating current adaptor system can transition from a low voltage level to a high voltage when the power state identification indicates that the alternating current adaptor is actively connected to the information handling system.

Figure 5:
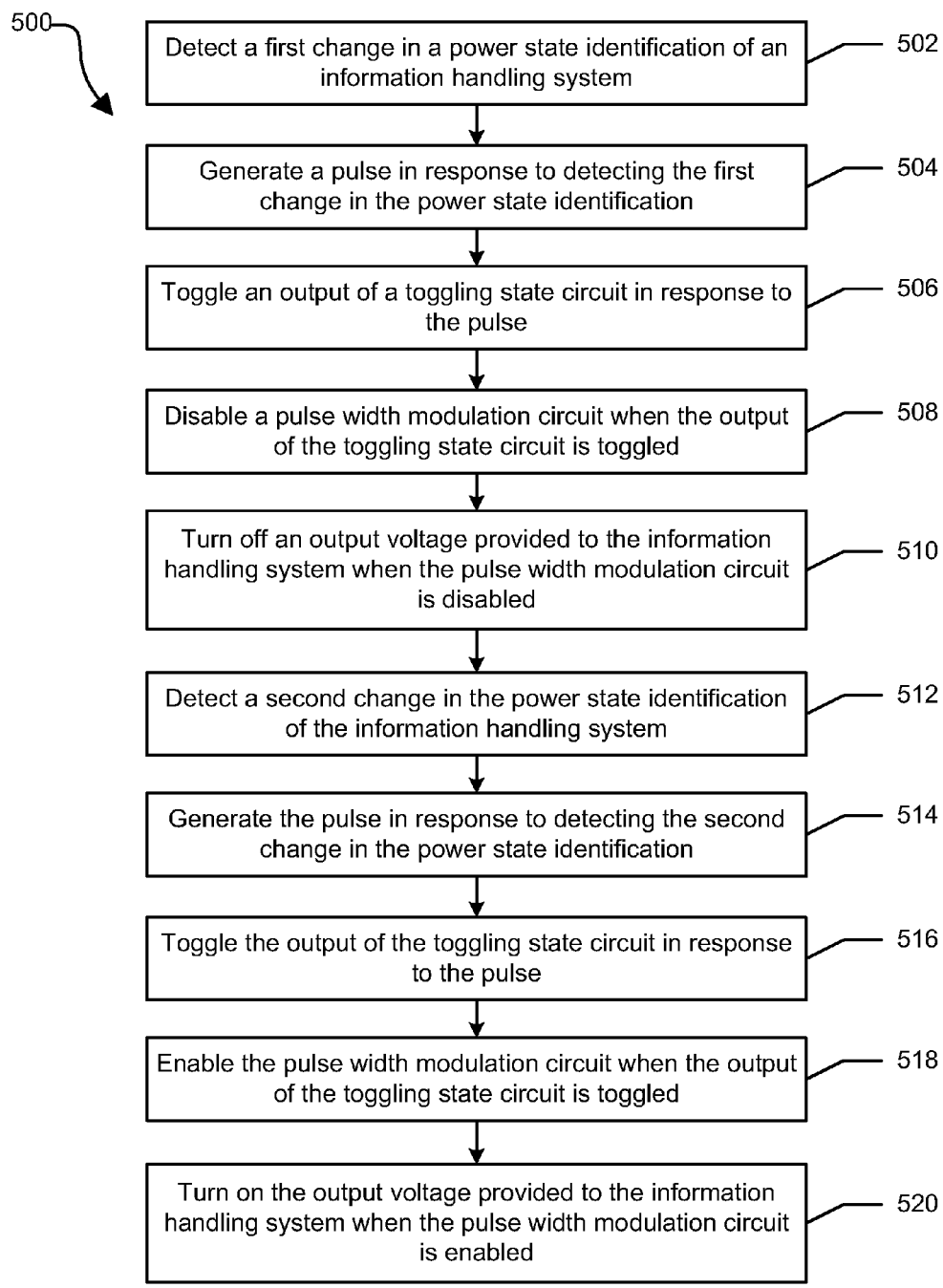
FIG. 5 is a flow diagram of another method for managing the alternating current adaptor.

FIG. 5 shows a flow diagram of another method 500 for managing the AC adaptor system 100. At block 502, a first change in a power state identification of an information handling system is detected. The first change in the power state identification can indicate that an alternating current adaptor system is plugged into the information handling system, that the alternating current adaptor system is unplugged from the information handling system, or that the alternating current adaptor system is plugged into the information handling system and that the alternating current adaptor system is isolated from the information handling system. A pulse is generated in response to detecting the first change in the power state identification of the information handling system at block 504.

At block 506, an output of a toggling state circuit is toggled in response to the pulse. In an embodiment, the output of the toggling state circuit can be toggled when a rising edge of the pulse is detected. In another embodiment, the output of the toggling state circuit can be toggled when a falling edge of the pulse is detected. A pulse width modulation circuit is disabled when the output of the toggling state circuit is toggled at block 508. At block 510, an output voltage provided to the information handling system is turned off when the pulse width modulation circuit is disabled.

At block 512, a second change in the power state identification of the information handling system. The pulse is generated in response to detecting the second change in the power state identification of the information handling system at block 514. At block 516, the output of the toggling state circuit is toggled in response to the pulse. The pulse width modulation circuit is enabled when the output of the toggling state circuit is toggled at block 518. At block 520, the output voltage provided to the information handling system is turned on when the pulse width modulation circuit is enabled.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An alternating current adaptor system comprising:
a high impedance power delivery network configured to provide an isolated power signal, wherein the isolated power signal is isolated from a primary side of the alternating current adaptor system;
a host detection circuit in communication with the high impedance power delivery network, the host detection circuit configured to detect a change in a power state of the information handling system, and to output a signal to indicate the change in the power state of the information handling system;
a pulse coupling circuit coupled to the host detection circuit, the pulse coupling circuit configured to output an isolated pulse in response to the signal from the host detection circuit; and
a state toggling circuit in communication with the pulse coupling circuit, the state toggling circuit configured to toggle an enable line of a pulse width modulation circuit between high and low in response to receiving the isolated low level pulse from the pulse coupling circuit.

2. The alternating current adaptor system of claim 1 further comprising:
an alternating current to direct current converter in communication with the state toggling circuit, the alternating current to direct current converter configured to provide a direct current output voltage to information handling system in response to the power state of the information handling system.

3. The alternating current adaptor system of claim 1 wherein the change in the power state of the information handling indicates that the alternating current adaptor system is plugged into the information handling system.

4. The alternating current adaptor system of claim 1 wherein the change in the power state of the information handling indicates that the alternating current adaptor system is unplugged from the information handling system.

5. The alternating current adaptor system of claim 1 wherein the change in the power state of the information handling indicates that the alternating current adaptor system is plugged into the information handling system and that the alternating current adaptor system is isolated from the information handling system.

6. A method comprising:
receiving, at a high impedance power delivery network, a direct current voltage from a primary side of an alternating current adaptor system;
creating, at the high impedance power delivery network, an isolated voltage by isolating and stepping down the direct current voltage from the primary side;
outputting the isolated voltage from the high impedance power delivery network to components of a secondary side of the alternating current adaptor system;
detecting a transition in a power state identification of an information handling system associated with the alternating current adaptor system;
toggling an enable line of a pulse width modulation circuit in response to a low voltage level pulse; and
alternating an output voltage level of the alternating current adaptor system in response to the transition in the power state identification of the information handling system.

7. The method of claim 6 further comprising:
generating the low voltage level pulse in response to detecting the transition in the power state identification of the information handling system;
if the input voltage of the pulse width modulation circuit is toggled to a high voltage level, enabling the pulse width modulation circuit; and
if the input voltage of the pulse width modulation circuit is toggled to a low voltage level, disabling the pulse width modulation circuit.

8. The method of claim 6 wherein components of the secondary side include a host detection circuit, an edge pulse generator, a device connection, and any combination thereof.

9. The method of claim 6 wherein the power state identification indicates that the alternating current adaptor system is plugged into the information handling system.

10. The method of claim 6 wherein the power state identification indicates that the alternating current adaptor system is unplugged from the information handling system.

11. The method of claim 6 wherein the power state identification indicates that the alternating current adaptor system is plugged into the information handling system and that the alternating current adaptor system is isolated from the information handling system.

12. The method of claim 6 wherein the voltage level of the alternating current adaptor system transitions from a high voltage level to a low voltage when the power state identification indicates that the alternating current adaptor is not connected to the information handling system or that the alternating current adaptor is isolated from the information handling system.

13. The method of claim 6 wherein the voltage level of the alternating current adaptor system transitions from a low voltage level to a high voltage when the power state identification indicates that the alternating current adaptor is actively connected to the information handling system.

14. A method comprising:
detecting a first change in a power state identification of an information handling system;

generating a pulse in response to detecting the first change in the power state identification of the information handling system;

toggling an output of a toggling state circuit in response to the pulse, wherein the output of the toggling state circuit is provided to a pulse width modulation circuit;

disabling the pulse width modulation circuit when the output of the toggling state circuit is toggled; and turning off an output voltage provided to the information handling system when the pulse width modulation circuit is disabled.

15. The method of claim 14 further comprising:

detecting a second change in the power state identification of the information handling system;

generating the pulse in response to detecting the second change in the power state identification of the information handling system;

toggling the output of the toggling state circuit in response to the pulse;

enabling the pulse width modulation circuit when the output of the toggling state circuit is toggled; and turning on the output voltage provided to the information handling system when the pulse width modulation circuit is enabled.

16. The method of claim 14 wherein the first change in the power state identification indicates that an alternating current adaptor system is plugged into the information handling system.

17. The method of claim 14 wherein the first change in the power state identification indicates that an alternating current adaptor system is unplugged from the information handling system.

18. The method of claim 14 wherein the first change in the power state identification indicates that an alternating current adaptor system is plugged into the information handling system and that the alternating current adaptor system is isolated from the information handling system.

19. The method of claim 14 wherein the output of the toggling state circuit is toggled when a rising edge of the pulse is detected.

20. The method of claim 14 wherein the output of the toggling state circuit is toggled when a falling edge of the pulse is detected.

* * * * *